July 24, 1923.
C. H. WIDSTRAND
HOOK FOR TIRE CHAINS
Filed July 17, 1922
1,462,590
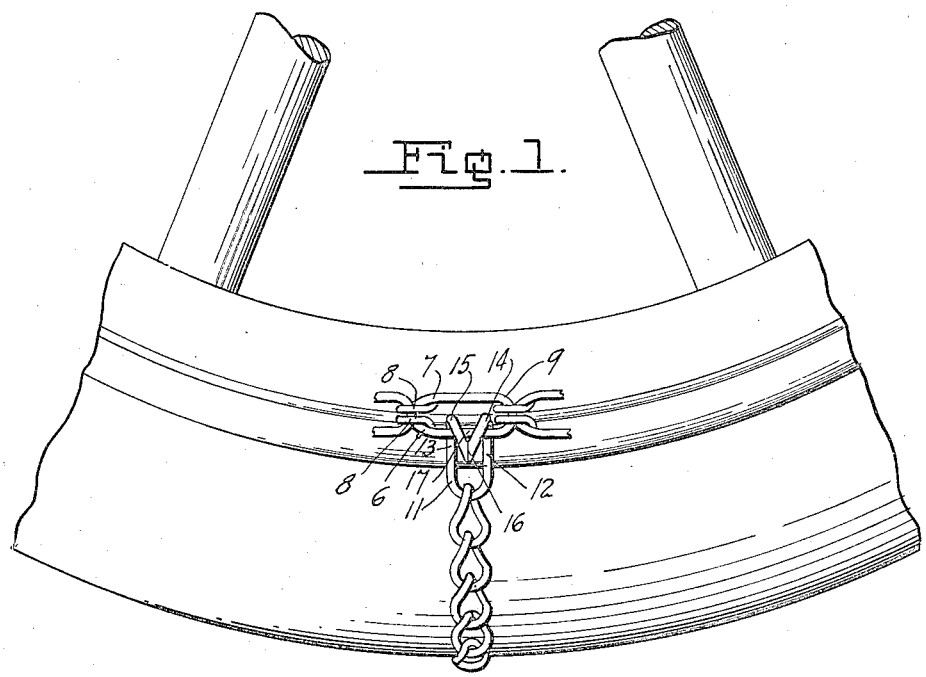
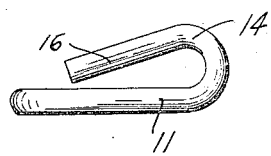
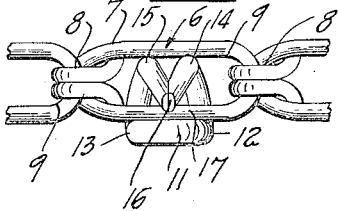
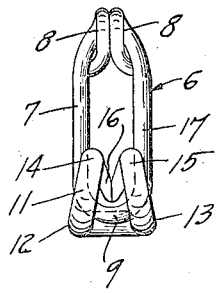
Inventor
Carl H. Widstrand
By Watson E. Coleman
Attorney Patented July 24, 1923.

1,462,590

UNITED STATES PATENT OFFICE.

CARL H. WIDSTRAND, OF LAKESIDE, MICHIGAN.

HOOK FOR TIRE CHAINS.

Application filed July 17, 1922. Serial No. 575,536.

*To all whom it may concern:*

Be it known that I, CARL H. WIDSTRAND, a citizen of the United States, residing at Lakeside, in the county of Berrien and State of Michigan, have invented certain new and useful Improvements in Hooks for Tire Chains, of which the following is a specification, reference being had to the accompanying drawings This invention relates to tire chains, and has for its object to provide a chain of this character wherein the tread chains may be detachably connected to the side chains.

It is another object of the invention to provide a chain of this character including the usual side and tread chains, with means for connecting the tread chains to the side chains, said tread chains and side chains being prevented from disengagement from each other when the side chains are disposed in their normal positions.

It is a further object of the invention to provide a chain of this character including side and tread chains the tread chains having a connecting member at each end, said connecting member being arranged to enter the small end of one link of the side chain, said connecting member preventing disengagement of the link of the side chain upon side movement of said link relative to the connecting member.

With these and other objects in view, the invention consists in the improved construction and arrangement of parts to be hereinafter more particularly described, fully claimed and illustrated in the accompanying drawings, in which:—

Figure 1 is a fragmentary elevation of an automobile tire showing the invention applied to a tire chain;

Figure 2 is a plan view showing the hook link for preventing disengagement of the straight portion of the link therefrom;

Figure 3 is a side elevation of the hook link; and

Figure 4 is an end elevation of the hook link showing the link of the tire chain in position to be applied, with the curved end of the link disposed in spaced relation to the bill of the hook.

Referring to the drawings, 6 designates a tire side chain for use in holding tread chains to the tire, the side chains comprising elongated links 7 having eyes 8 at one end adapted to receive the small curved end portion 9 of the adjacent link. One of these chains is disposed on each side of the wheel, the ends of the chain being connected by any suitable means to prevent disengagement to the chain from the tire.

In connection with the side chains a plurality of tread chains are used, said tread chains comprising the conventional form of twisted link. In order to connect the tread chains to the side chains 6, there is provided novel connecting means in the form of a hook link 11, said link consisting of a length of material bent at its middle portion to provide one end of the link and also to provide a pair of arms 12 and 13, said arms being disposed in spaced substantially parallel relation to each other. The end portions 14 and 15 of the arms 12 and 13 respectively are bent or returned upon their respective arms and project towards the said arms in convergent relation to each other until their extremities substantially contact with each other as best illustrated in Figs. 1 and 2, and the confronting side faces of said extremities are beveled whereby the bill of a hook 16 is formed. By this arrangement and construction a restricted opening is provided at the point 17 which will not permit the passage of a straight member but only the passage of a curved member, or in other words the passage of a member capable of extending partly between the arms 12 and 13 at the entrance 17.

In the application of the tread chain to the side chains, the link of the side chain adjacent the connecting member 11 of the tread chain is extended outwardly by permitting the end portion 8 of the side chain link to engage a side portion of the adjacent link of the side chain. This extends the side chain link substantially at right angles to the side chain and permits the end portion 9 of said chain to be inserted beneath the end portions 14 and 15, into the space between the arms 12 and 13, at the point 17, and then beneath the end portions or bill 16 to the opposite end of the link defined by the junction of the end portions 14 and 15 with the arms 12 and 13. The side chain link will then assume its normal position, that is, substantially in alignment with the remaining links of the chain. This positions the side portion of the link laterally of the hook link and in view of the fact that the side portion is substantially straight, movement of said side portion beyond the extremity of the end portions 14 and 15 at the entrance 17 is impossible, in view of the fact that the side portion cannot enter the space between the arms. The only way possible for the side chain to be disconnected from the tread chain is to dispose the small curved end of the link in the space between the arms so as to permit the same to clear the extremities of the end portions 14 and 15. Accidental disengagement of the side chains or tread chains from each other is thereby rendered impossible, regardless of the relative movement of the side and tread chains. At the same time it permits the tread chains to be adjusted to suit the user and also facilitates the application of the tire chain.

From the foregoing it will be readily seen that this invention provides a novel tire chain wherein novel means are used for connecting and disconnecting the tread chains without the use of tools, and without danger of the tread chains becoming accidentally disengaged from the side chains. In addition to this the application of the side chains through the medium of a novel form of hook link may be accomplished by an unskilled person.

What is claimed is:—

Means for connecting a tread chain with a side chain, comprising a hook link consisting of a length of material doubled upon itself at its middle portion to provide spaced arms, the end portions of said arms being returned upon the arms and inclining toward the same and in convergent relation with one another to form a bill, the distance between the under surface of the bill and the plane of the upper surfaces of the arms being less than the diameter of the material of which the side chain links are formed, the under surface of said bill being disposed at that side of the arms upon which the end portions of the arms are returned.

In testimony whereof I hereunto affix my signature.

CARL H. WIDSTRAND.